United States Patent [19]
Cohen et al.

[11] Patent Number: 5,680,490
[45] Date of Patent: Oct. 21, 1997

[54] COMB SPLITTING SYSTEM AND METHOD FOR A MULTICHANNEL OPTICAL FIBER COMMUNICATION NETWORK

[75] Inventors: Leonard G. Cohen, Atlanta; Yuan P. Li, Duluth, both of Ga.

[73] Assignee: Lucent Technologies Inc., Murray Hill, N.J.

[21] Appl. No.: 525,938

[22] Filed: Sep. 8, 1995

[51] Int. Cl.$^6$ .................................................. G02B 6/28
[52] U.S. Cl. ................................................. 385/24; 385/46
[58] Field of Search ................................. 385/24, 37, 46, 385/27

[56] References Cited

U.S. PATENT DOCUMENTS

| | | | |
|---|---|---|---|
| 5,002,350 | 3/1991 | Dragone | 350/96.15 |
| 5,243,672 | 9/1993 | Dragone | 385/46 |
| 5,339,157 | 8/1994 | Glance et al. | 385/24 |
| 5,341,444 | 8/1994 | Henry et al. | 385/46 |
| 5,373,516 | 12/1994 | Glance et al. | 385/37 |
| 5,412,744 | 5/1995 | Dragone | 385/37 |
| 5,461,685 | 10/1995 | Glance et al. | 385/27 |
| 5,473,719 | 12/1995 | Stone | 385/24 |
| 5,488,500 | 1/1996 | Glance | 385/24 |
| 5,488,680 | 1/1996 | Dragone | 385/37 |
| 5,493,625 | 2/1996 | Glance | 385/24 |
| 5,542,010 | 7/1996 | Glance et al. | 385/24 |

*Primary Examiner*—John Ngo

[57] ABSTRACT

A comb splitting system demultiplexes and/or multiplexes a plurality of optical signal channels at various wavelengths. The comb splitting system has at least two interconnected successive stages of wavelength division multiplexers (WDMs). A WDM of a first stage communicates bands of channels to respective WDMs of the second stage via suitable optical paths. Each of the bands has a plurality of the individual channels that are separated by at least one other of the channels. Each second stage WDM, which is allocated to a particular band, is interconnected to optical paths, each for carrying one or more individual channels. Furthermore, in accordance with a significant feature of the present invention, the bandpasses and bandpass periodicity (free spectral range) associated with the first stage WDM are smaller than the bandpasses and bandpass periodicity associated with the second stage WDMs. The foregoing feature has numerous advantages. The second stage WDMs are less expensive and physically smaller than the first stage WDM. Crosstalk between channels is reduced. The alignment of the WDM passbands with the wavelengths of the transmitters/receivers in a central office is simplified. Later stages of WDMs can tolerate larger fabrication errors, do not require flat passbands and birefringence compensation, and can tolerate full environmental temperature variations without feedback control in the central office.

34 Claims, 6 Drawing Sheets

COMB SPLITTING SYSTEM AND METHOD FOR A MULTICHANNEL OPTICAL FIBER COMMUNICATION NETWORK

FIELD OF THE INVENTION

The present invention generally relates to optical fiber communication networks, and more particularly, to a comb splitting system and method for a multichannel optical fiber communication network for multiplexing and/or demultiplexing an optical signal having a plurality of individual channels at various wavelengths.

BACKGROUND OF THE INVENTION

Recent research and development has focused on implementing optical communication networks to communicate information from central offices to individual living units (e.g., a subscriber's home) and from living units to the central offices. Several network approaches are possible, including for example, a point-to-point network, a power splitting network, or a wavelength division multiplexing network, as are further discussed hereafter.

In a point-to-point network, one or more optical fibers directly link the central office to each living unit. This approach is perhaps the most straightforward and simplistic. However, it is apparent that even in the smallest network, this solution would involve an economically prohibitive number of interconnections, optical fibers, trenches, transmitters, and receivers.

In a power splitting network, a transmitter, receiver, and part of an optical fiber in the subscriber loop is shared by many living units using power splitters, a wide variety of which are well known in the art. As an example, U.S. Pat. No. 4,904,042 to Dragone describes a star coupler, which is a typical power splitter (PS). In a sense, a power splitter causes each signal to be broadcast over various fibers so that each living unit receives each signal. Although this network architecture is simple and low cost, it has large power penalties due to the power splitting, a small bandwidth due to the time sharing, poor subscriber privacy due to the broadcast distribution, and poor diagnostic and test capabilities in that individual subscriber lines cannot be adequately diagnosed and tested.

A wavelength division multiplexing network employs wavelength division multiplexers (WDM). In this network, a particular channel (wavelength of carrier) is allocated to each living unit. Further, various channels are multiplexed over a single optical fiber and demultiplexed on individual fibers associated with each living unit utilizing WDMs, so that a virtual point-to-point connection between the central office and each living unit is achieved. WDMs, sometimes referred to as a filter or router, are well known in the art and are generally a device that can multiplex and/or demultiplex optical signal wavelengths. In general, a WDM is usually a passive optical network (PON) or device with multiple optical paths, each of which exhibits a particular passband, similar to an electrical signal processing filter. The passband permits passage of one or more particular wavelengths along the respective optical path, to the substantial exclusion of others. Thus, the WDM can be used to divide wavelengths (or channels) from a multichannel optical signal or to combine various wavelengths (or channels) on respective optical paths into one multichannel optical signal on one optical path. For an example of a WDM, see C. Dragone et al., "Integrated Optics N×N Multiplexer on Silicon," *IEEE Photon. Technol. Lett.*, Vol. 3, p. 896 (1989), the disclosure of which is also set forth in U.S. Pat. No. 5,136,671 to Dragone.

A WDM network has less power loss in principal than the power splitting network and, furthermore, provides privacy in that each living unit only receives its respective channel. Although the WDM network offers a technically superior solution as compared to the power splitting network, the WDM network has historically required expensive, cost prohibitive components, i.e., the WDMs and wavelength-aligned transmitters and receivers. However, the recent development of less expensive key components makes the WDM network a more attractive approach. Examples of these key components include integrated WDMs, such as a waveguide grading router (WGR) as disclosed in C. Dragone et al., "Integrated Optics N×N Multiplexer on Silicon," *IEEE Photon. Technol. Lett.*, Vol. 3, p. 896 (1989) (the disclosure of which is also set forth in U.S. Pat. No. 5,136,671 to Dragone) and Fourier transform based waveguide filters (FF) as disclosed in pending U.S. patent application by Y. P. Li, et al., entitled "A Monolithic Optical Waveguide Filter Based On Fourier Expansion," with Ser. No. 08/365,618 and filed Dec. 28, 1994.

A practical WDM network favors a two stage split of channels over a single stage split for the following reasons. On the one hand, a WDM network is economic when the number of splits is large. However, WGRs with large splitting ratios (e.g., 1×32) and good performance are expensive to fabricate. On the other hand, there are typically at least two natural splice nodes in a typical access network. A single fiber cable, housing many fibers, runs from the central office to a remote node (RN1) about three km away, and close to the center of a service area. These fibers are then split into smaller groups, each of which runs to another node, or pedestal (RN2), serving typically four to sixteen living units. The remote node (RN1) and pedestal (RN2) provide preexisting locations to install WDMs. By installing two stages of WDMs to increase the split ratio, the fiber count as well as the system cost can be reduced.

In a band splitting multistage WDM network, the first stage makes a coarse split, and subsequent stages make finer and finer splits. In this scheme, the WDMs of the subsequent stages are largest in quantity, but are the most expensive to fabricate because they have the smallest channel spacing. Another disadvantage is that in order to maintain low loss for all channels, the WDMs in subsequent stages are required to have nearly flat passbands with sharp drop offs. Furthermore, the passbands of the subsequent stage WDMs should line up with the central office transmitters and receivers, which is difficult because the subsequent stage WDMs are installed at different locations and experience different temperature shifts of the transmission spectrum (i.e., usually about 0.012 nm/g°C.).

Hence, a heretofore unaddressed need exists in the industry for a system and method for multiplexing and demultiplexing a plurality of optical signal channels at respective wavelengths using a multistage WDM network that can be implemented in two stages, if desired, and that does not suffer from the aforementioned problems and disadvantages.

SUMMARY OF THE INVENTION

Briefly stated, the present invention provides for a comb splitting system and method for implementing a multistage WDM network. The comb splitting system and method can be utilized in a demultiplexing mode to demultiplex an optical signal having a plurality of multiplexed channels at various wavelengths into a plurality of individual channels and/or in a multiplexing mode to multiplex a plurality of channels at different wavelengths into a single optical signal.

Structurally, the comb splitting system has at least two interconnected successive stages of WDMs. The system is described relative to two stages, but it should be understood that more than two may be implemented. A WDM of the first stage is interconnected with an optical path, for example, an optical fiber, waveguide, or other optical signal carrier that carries a multichannel optical signal having a plurality of individual channels at various wavelengths. The first stage WDM communicates bands of channels to respective WDMs of the second stage via suitable optical paths. Each of the bands has a plurality of the individual channels that are separated by at least one other of the channels. Each second stage WDM, which is allocated to a particular band, is interconnected to optical paths, each for carrying one or more individual channels. Furthermore, in accordance with a significant feature of the present invention, the bandpasses associated with the first stage WDM is narrower than the bandpasses associated with the second stage WDMs.

The first and second stage WDMs can reside on a single integrated circuit, for example, an optical application specific integrated circuit (OASIC). They can also be situated within separate discrete electronic components that are connected locally at a node of an optical fiber network. Moreover, they can be remotely separated. For instance, they can be situated at different nodes of an optical fiber network and interconnected via a fiber cable so that a distribution network is formed.

The operation of the comb splitting system is as follows. Because the operation of the comb splitting system in the multiplexing mode is generally analogous to the demultiplexing mode but in reverse order, only the operation in the demultiplexing mode is set forth hereafter for simplicity. The first stage WDM receives the multichannel optical signal having the plurality of individual channels at various wavelengths. The first stage WDM demultiplexes the optical signal into a plurality of bands by utilizing narrow bandpasses. Each of the bands has a plurality of the individual channels that are separated by at least one other of the channels. Furthermore, the second stage has a WDM allocated to each of the bands for demultiplexing the individual channels from each of the bands with wide bandpass filters that have a wider bandpass than the narrow bandpass filters associated with the first stage WDM.

The novel method provided by the present invention can be broadly summarized as follows. In the demultiplexing mode, first, an optical signal having a plurality of individual channels at various wavelengths is received by a first stage WDM, and bands of individual channels are demultiplexed from the plurality by utilizing first bandpasses in the first stage WDM. The channels in each of the bands being separated by at least one other channel. Second, the bands are communicated to respective second stage WDMs and individual channels are demultiplexed from each of the bands by the second stage WDMs with bandpasses that are wider than the bandpasses of the first stage WDM.

Similarly, but in reverse order, the novel method as applied to the multiplexing mode is as follows. First, a plurality of individual channels are multiplexed into bands via bandpasses associated with second stage WDMs. The channels in each of the bands are separated by at least one other channel. Second, the bands are multiplexed from the plurality to form a single multichannel signal by utilizing a first stage WDM and its associated bandpasses that are narrower than the bandpasses of the second stage WDMs.

The present invention has numerous advantages, a few of which are delineated hereafter, as merely examples.

An advantage of the comb splitting system is its cost effectiveness. Inexpensive WDMs can be utilized in the second and subsequent stages, while a more expensive WDM having narrower bandpasses is utilized in the first stage.

Another advantage of the comb splitting system is that it effectively reduces accumulated crosstalk between channels. In fact, the inventors have determined that there is approximately 8 decibels (dB) of reduction in crosstalk in a 32 channel system.

Another advantage of the comb splitting system is that it is substantially insensitive to temperature fluctuations, especially when implemented in a distribution network where the first and second stages reside at different physical node locations.

Another advantage of the comb splitting system is that it permits testing of individual optical paths using, for example, optical time domain reflectometry (OTDR).

Another advantage of the comb splitting system is that it is simple in structure, easy to implement and fabricate on a mass scale, and reliable in operation.

Another advantage of the comb splitting system is that it can be implemented on a single integrated circuit (IC) or in stages of ICs. Ip Another advantage of the comb splitting system is that it can be implemented with completely passive elements to created a PON.

Another advantage of the comb splitting system is that it can be implemented with a device having both a WDM and a power splitting mechanism. An example of such a device is described in U.S. Pat. No. 5,285,305 to Cohen et al.

Other features and advantages of the present invention will become apparent to one with skill in the art upon examination of the following drawings and detailed description. It is intended that all such additional features and advantages be included herein within the scope of the present invention, as is defined in the appended claims.

BRIEF DESCRIPTION OF THE DRAWINGS

The present invention can be better understood with reference to the following drawings. The drawings are not necessarily to scale, emphasis instead being placed upon clearly illustrating principles of the present invention. Moreover, like reference numerals designate corresponding parts throughout the several views.

DETAILED DESCRIPTION OF THE PREFERRED EMBODIMENT

Figure 1:
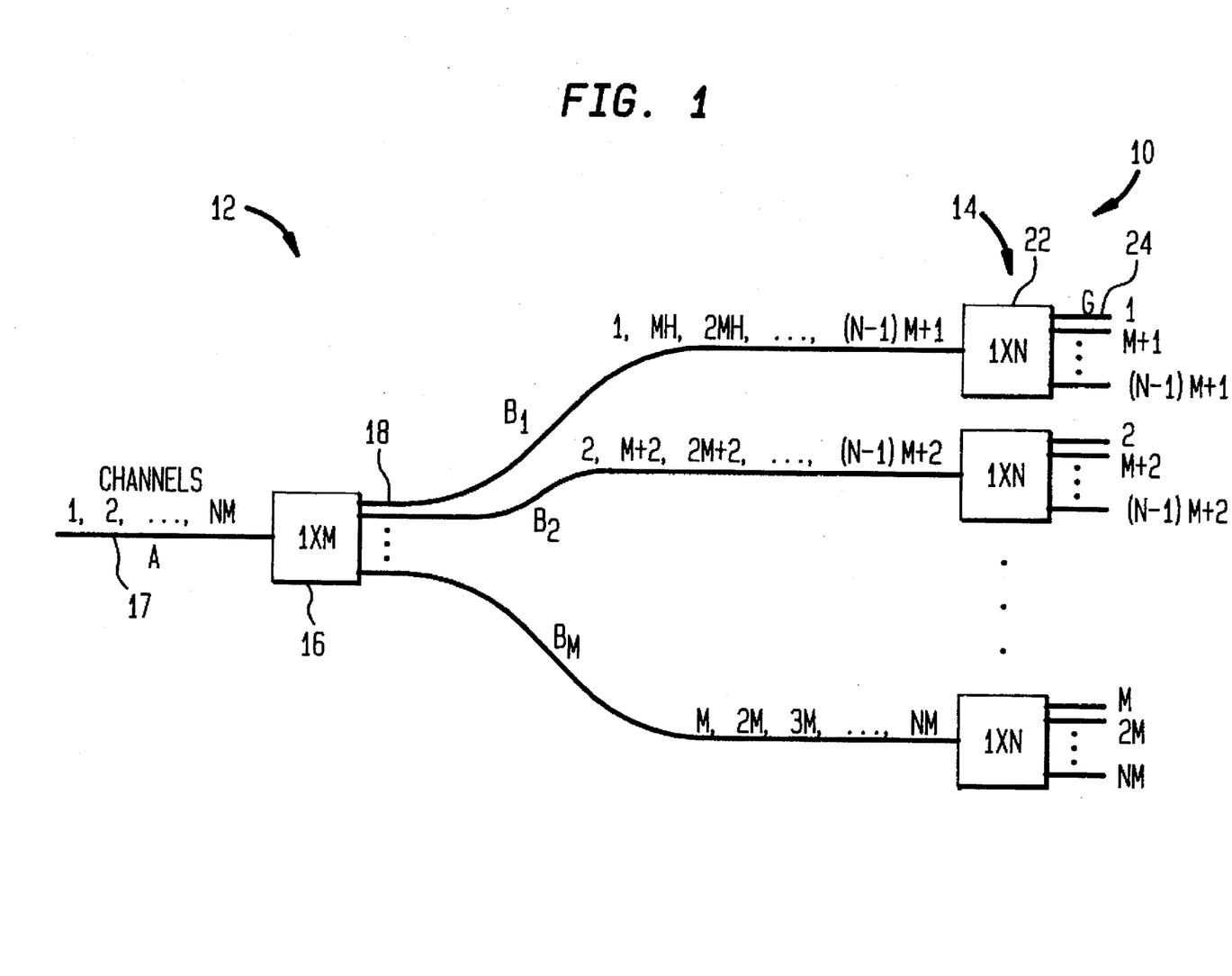
FIG. 1 is a block diagram illustrating the comb splitting system and method of the present invention wherein the system has one 1×M (1 optical path in/out; M optical paths out/in) WDM in the first stage, M 1×N WDMs in the second stage, and NM channels.

The generalized comb splitting system in accordance with the present invention is illustrated in FIG. 1 and is denoted by the reference numeral 10. The comb splitting system 10 has at least two interconnected successive stages 12, 14. The first stage 12 has a 1×M WDM 16 with an input/output optical path 17 for carrying the optical signal having NM channels and M output/input optical paths 18. The WDM 16 demultiplexes and/or multiplexes the optical signal on optical path 17 into/from M bands by utilizing narrow bandpasses. Each of the M bands has a plurality of individual channels that are separated by at least one other of the channels. In the preferred embodiment, the bands are defined as follows. A first band with channels 1, M+1, 2M+1 ..., (N−1) M+1 is carried on branch $B_1$. A second band with channels 2, M+2, 2M+2 ..., (N−1) M+2 is communicated on branch $B_2$. The foregoing pattern continues until reaching the Mth branch $B_M$ with channels M, 2M, 3M, ..., NM.

The second stage 14 has M parallel 1×N WDMs 22. Each of the WDMs 22 is configured to communicate a respective one of the M bands on a respective optical path 18. Each WDM 22 demultiplexes and/or multiplexes individual channels from its corresponding band. In the preferred embodiment, the M WDMs 22 demultiplex and/or multiplex the individual channels as follows: 1, M+1, ..., (N−1) M+1; 2, M+2, ..., (N−1) M+2; and M, 2M, ..., NM.

Note that the comb splitting system 10 of FIG. 1 can be periodic with a periodicity $N_1N_2\Delta$, where $N_1$ is the first stage split ratio and where $N_2$ is the second stage split ratio. Along these lines, a wavelength $\lambda'$ located $N_1N_2\Delta$ away from $\lambda_1$ goes to the same output as $\lambda_1$. Thus, the system 10 can be constructed with more than two stages, if desired. For example, the 1×M first stage WDM 16 can be implemented as the entire 1×NM system 10 as shown in FIG. 1, so that M is changed to NM and a three stage 1×N²M system 10 is formed.

The WDMs 16, 22 can be any suitable WDM. An example of a suitable WDM is disclosed in C. Dragone et al., "Integrated Optics N×N Multiplexer on Silicon," *IEEE Photon. Technol. Lett.*, Vol. 3, p. 896 (1989), the disclosure of which is also set forth in U.S. Pat. No. 5,136,671 to Dragone. The foregoing documents are incorporated herein by reference. As another example, the WDMs 16, 22 may also be implemented as a Fourier filter, as is set forth in copending application entitled "Monolithic Optical Waveguide Filters Based On Fourier Expansion" with Ser. No. 08/365,618 and filed on Dec. 28, 1994, the disclosure of which is incorporated herein by reference as if set forth in full hereinbelow.

The optical paths 17, 18, 24 can be any suitable medium for communicating optical signals, including but not limited to, optical fibers or waveguides.

The comb splitting system 10 can be physically implemented in several different ways. The WDMs 16, 22 of the comb splitting system 10 can reside on a single integrated circuit, for example, an optical application specific integrated circuit (OASIC). With this configuration, the optical paths 18 can be integrated circuit optical waveguides. They can also be situated within separate discrete electronic components that are connected locally at a node (e.g., RN1, RN2) of an optical fiber network. Moreover, they can be remotely separated. For instance, they can be situated at different nodes (e.g., RN1, RN2) of an optical fiber network and interconnected via a fiber cable(s) 18 or waveguide(s) 18 so that a distribution network is formed.

In accordance with a significant feature of the present invention, the second stage WDMs 22 are configured to utilize bandpasses that are wider than the bandpasses utilized by the first stage WDM 16, and the periodicity (i.e., the free spectral range, FSR) of channels at the second stage WDMs 22 is larger than at the first stage WDMs 16.

As a result of the foregoing configuration, the system 10 has numerous advantages, a few of which are delineated hereafter. First, the second stage WDMs 22 are less expensive and physically smaller than the first stage WDM 16. Second, the separation and routing of channels in the system 10 reduces crosstalk between the channels, or interference caused by coupling of channels. Specifically, in the demultiplexing mode, any crosstalk resulting from the first stage 12 is cleaned up by the second stage 14, and in the multiplexing mode, any crosstalk resulting from the second stage 14 is cleaned upon in the first stage 12. Third, the synchronization of the WDM passbands with the wavelengths of the transmitters/receivers in the central office is also much easier because only the first stage WDM 12, which is at a single location (RN1) close to the central office, needs to be synchronized. Fourth, because of their much wider passbands and FSR, the WDMs at later stages can tolerate larger fabrication errors, do not require flat passbands and birefringence compensation, and can tolerate full environmental temperature variations without feedback control in the central office. These and other advantages will become more apparent in later discussions pertaining to specific implementations.

FIRST EMBODIMENT OF THE COMB SPLITTING SYSTEM

Figure 2:
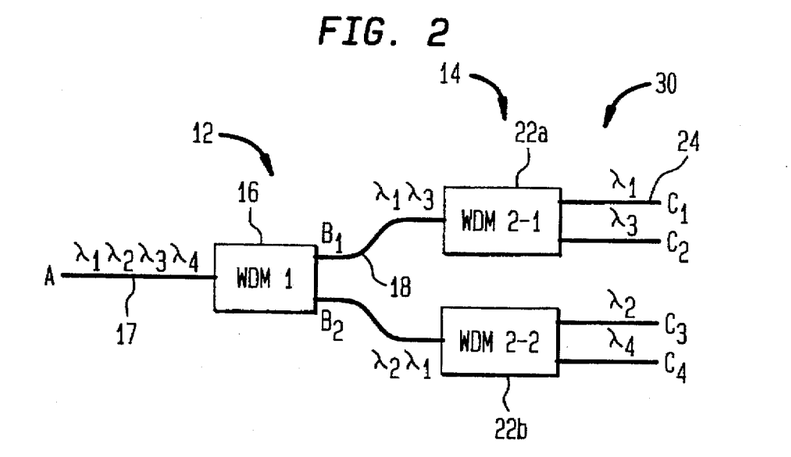
FIG. 2 is a block diagram illustrating a first embodiment of the comb splitting system of FIG. 1 wherein the first embodiment has two stages, one 1×2 WDM in the first stage, two 1×2 WDMs in the second stage, and four channels.
Figure 3:
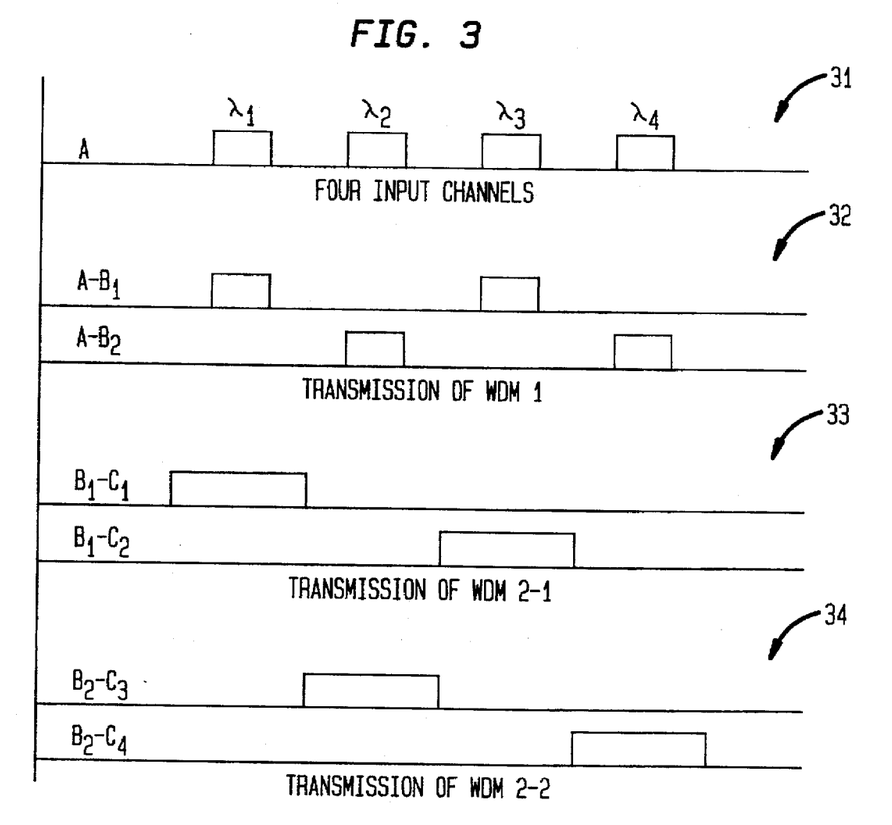
FIG. 3 is a graph illustrating channel passbands in the specific comb splitting system of FIG. 2.

FIG. 2 illustrates a first embodiment 30 of the generalized comb splitting system 10 of FIG. 1 and is meant to be a nonlimiting example, and FIG. 3 graphically illustrates the passbands associated with the first and second stage WDMs 16, 22 of FIG. 1. As shown in FIG. 1, the comb splitting system 30 is a 1×4 device, having a 1×2 WDM 12 in its first stage 12 and two 1×2 WDMs 22a, 22b in its second stage 14.

The first stage WDM 16 communicates with an optical signal on optical path 17 having four channels $\lambda_1$, $\lambda_2$, $\lambda_3$, $\lambda_4$, which are preferably equally spaced in frequency as shown at reference numeral 31 in FIG. 3 with the spacing $\Delta$ of, for example but not limited to, $\Delta=400$ gigahertz (GHz). The first stage WDM 16 has channel spacing equal to $\Delta$ and a periodicity (i.e., the free spectral range, FSR) $M\Delta$, where $M=2$ is the first stage split ratio. Thus, in the demultiplexing mode, the first stage WDM 16 divides the four channels into two combs, with $\lambda_1\lambda_3$ in one output and $\lambda_2\lambda_4$ in the other, as is further illustrated in FIG. 3 at reference numeral 32.

The second stage WDMs 22a, 22b have a channel spacing $M\Delta$ and FSR $MN\Delta$, where $N=2$ is the second stage split ratio. The transmission spectrum of second stage WDM 22b is shifted by $\Delta$ relative to that of second stage WDM 22a, so that the centers of passbands of both WDMs 22 always line up with the input channels $\lambda_1$ through $\lambda_4$, as illustrated at reference numerals 33, 34 in FIG. 3. The second stage WDMs 22 thus further split the combs from the first stage WDM 16 into separate channels.

SECOND EMBODIMENT OF THE COMB SPLITTING SYSTEM

Figure 4:
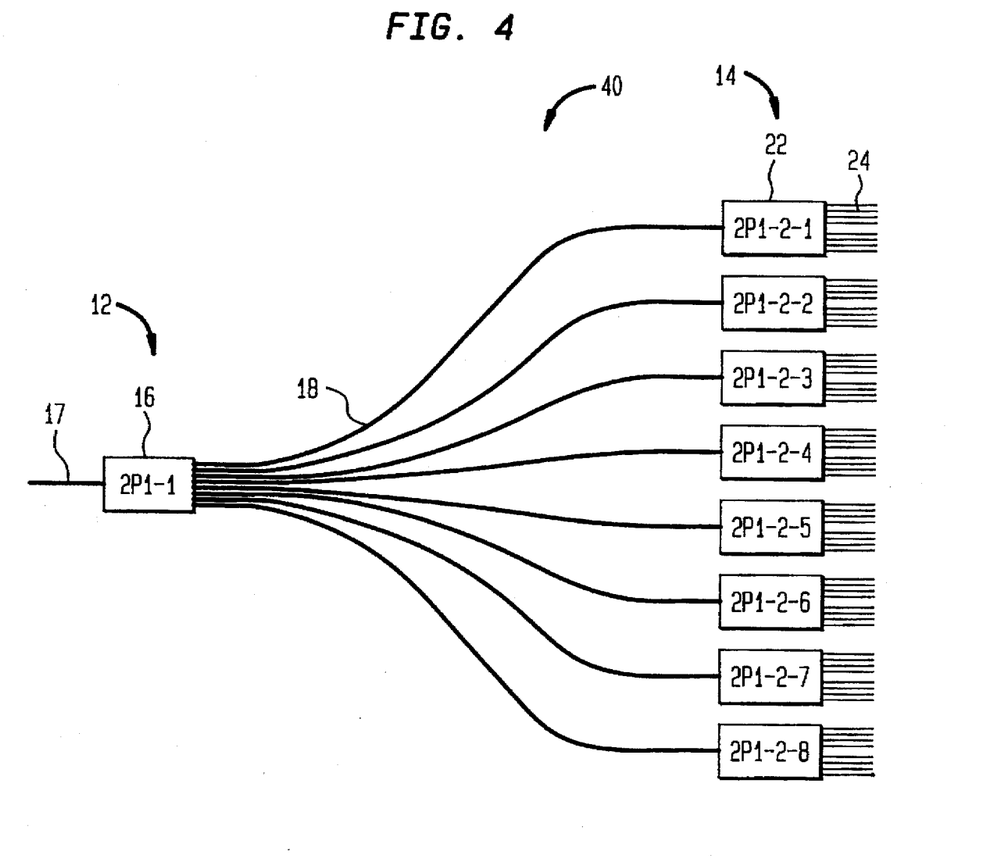
FIG. 4 is a block diagram of a second embodiment of the comb splitting system of FIG. 1 wherein the second embodiment has two stages, a 1×8 WDM/PS mechanism in the first stage, eight 1×4 WDM/PS mechanisms in the second stage, 32 WDM channels, and 32 PS channels.

A second embodiment of the comb splitting system 10 of FIG. 1 is illustrated in FIG. 4 and generally denoted by reference numeral 40. The comb splitting system 40 is a 1×32 device for demultiplexing a multichannel signal into 32 WDM channels and 32 PS signals. In structure, the comb splitting system 40 has a first stage 12 with a single 1×8 combined WDM/PS mechanism 16 interconnected with a second stage 14 having eight 1×8 WDM/PS mechanisms 22. In essence, each of the combined WDM/PS mechanisms 16, 22 serves as both a WDM and a PS, depending upon the wavelength of a channel.

For purposes of discussion, hereafter, a "coarse WDM" (or "CWDM") is a WDM having a wider bandpass and larger FSR than another WDM (i.e., "dense WDM"), and a "dense WDM" (or "DWDM") is a WDM having a narrower bandpass and smaller FSR than another WDM (i.e., "coarse WDM"). Moreover, the coarse WDM (or CWDM) is used to separate or combine the PS band and the WDM band.

It is advantageous to include a PS with a WDM for at least the following reasons. First, some distribution schemes, e.g., broadcasting cable television (TV) signals using high powered linearized optical fiber amplifiers (LOFA) requires power splitters. Second, it would be more economically viable to initially employ PSs in inexpensive low speed non-wavelength-selective transmitters and receivers when the bandwidth requirement is small, and upgrade the system to a fully WDM network when the bandwidth requirement becomes large. A suitable WDM/PS mechanism 16, 22 is described in U.S. Pat. No. 5,285,305 to Cohen et al.

The comb splitting system 40 is used as a demultiplexer as follows. A coarse WDM (not shown) combines a PS signal and the WDM channels at the central office and forwards the combined optical signal to the first stage WDM/PS mechanism 16 via optical path 17, as shown in FIG. 4. Preferably, the first stage WDM/PS mechanism 16 is housed in the first remote node (RN1) located near the center of a service area of typically up to about 480 LUs. Each RN1 serves up to 480 LUs, and therefore, there are typically fifteen WDM/PS mechanisms 16 in a single RN1 enclosure, with a single-sheath (bundle) multi-fiber cable running from the CO to RN1. Each of the eight RN1 outputs serves a separate pedestal (RN2), which host a second stage WDM/PS mechanism 22 serving four LUs.

Figure 5:
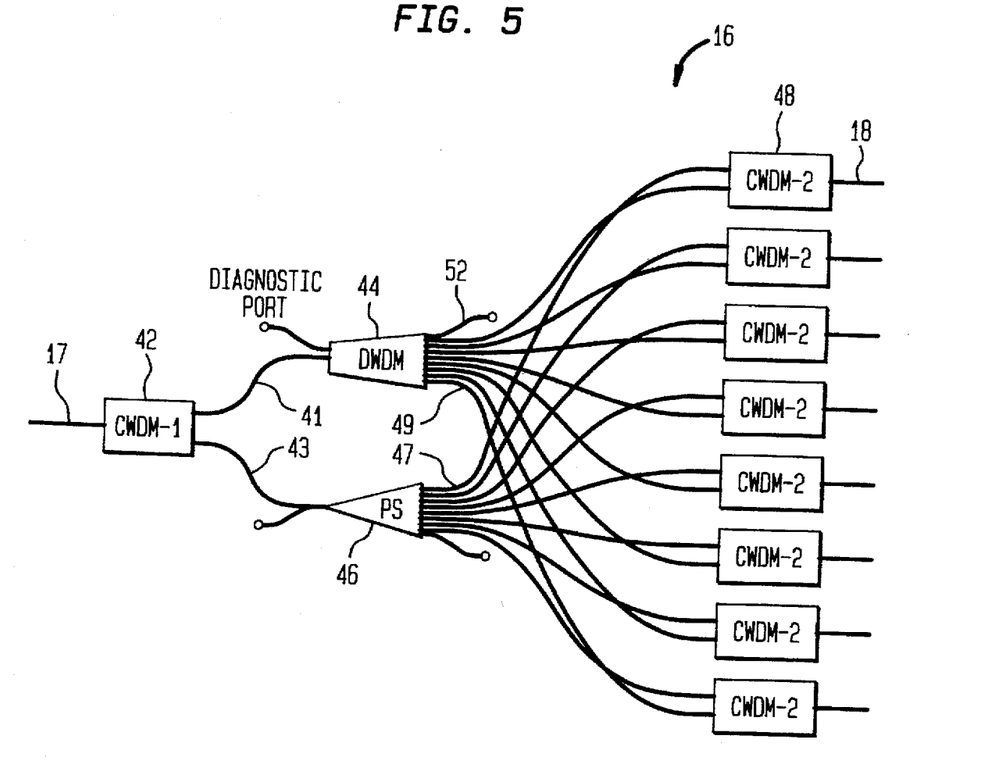
FIG. 5 is a block diagram illustrating the WDM/PS mechanism in the first stage of FIG. 4.

FIG. 5 illustrates further details of the preferred embodiment of the WDM/PS mechanism 16 (FIG. 4). With reference to FIG. 5, the WDM/PS mechanism 16 has a CWDM 42 at its input. The CWDM 42 splits the two wavelength bands and feeds them into a 1×4 DWDM 44 and a 1×4 PS 46, respectively. Each output of the DWDM 44 is subsequently combined with an output of the PS 46, using another CWDM 48 that has the same spectral response as the CWDM 42. Thus, for one wavelength band (referred to as the WDM band), the WDM/PS mechanism 16 functions as a WDM, and for the other wavelength band (the PS band), the WDM/PS mechanism 16 functions transparently as a PS. If both wavelength bands are present at the input optical path 17, each output optical path 24 gets ⅛ of the power of the PS band and a wavelength channel of the WDM band.

Extra ports 52 can be added for diagnostic purposes. For example, a 2×5 DWDM and a 2×5 PS can be used instead of 1×4's, with the extra output having a fraction (e.g. 1/10) of the power of the regular outputs, thus providing direct local access to the PS and WDM signals.

Figure 6:
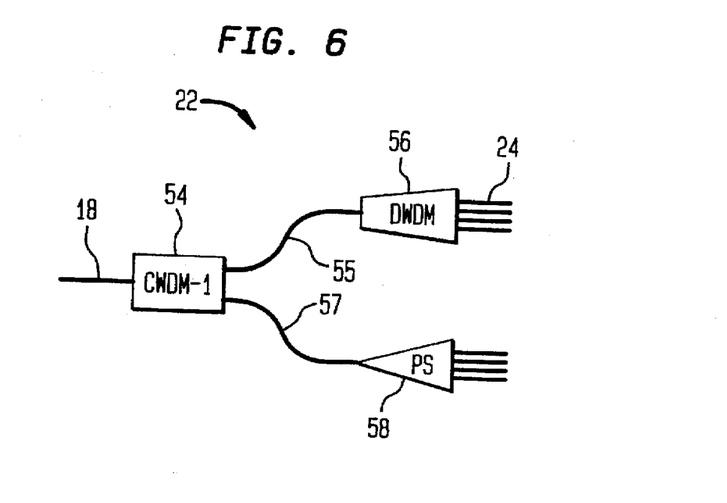
FIG. 6 is a block diagram illustrating the WDM/PS mechanism in the second stage of FIG. 4.

FIG. 6 illustrates further details of the preferred embodiment of the WDM/PS mechanism 22 (FIG. 4). Each WDM/PS mechanism 22 comprises a CWDM 54 interconnected with a DWDM 56 via optical path 55 and a PS 58 via optical path 57. The DWDM 56 receives a collection of four WDM signals on optical path 55 and filters and separates these channels to provide a restrictive channel on each optical path 24. Furthermore, the PS 58 receives a collection of four broadcast signals on optical path 57 and filters and separates the broadcast signals to provide a respective broadcast signal on each of four optical paths 24.

In some cases, e.g., in an optical network unit (ONU) where the WDM/PS mechanism 22 of FIG. 6 are fed to separate detectors for the PS and WDM bands, the CWDMs 42 (FIG. 5) are not needed.

Figure 7:
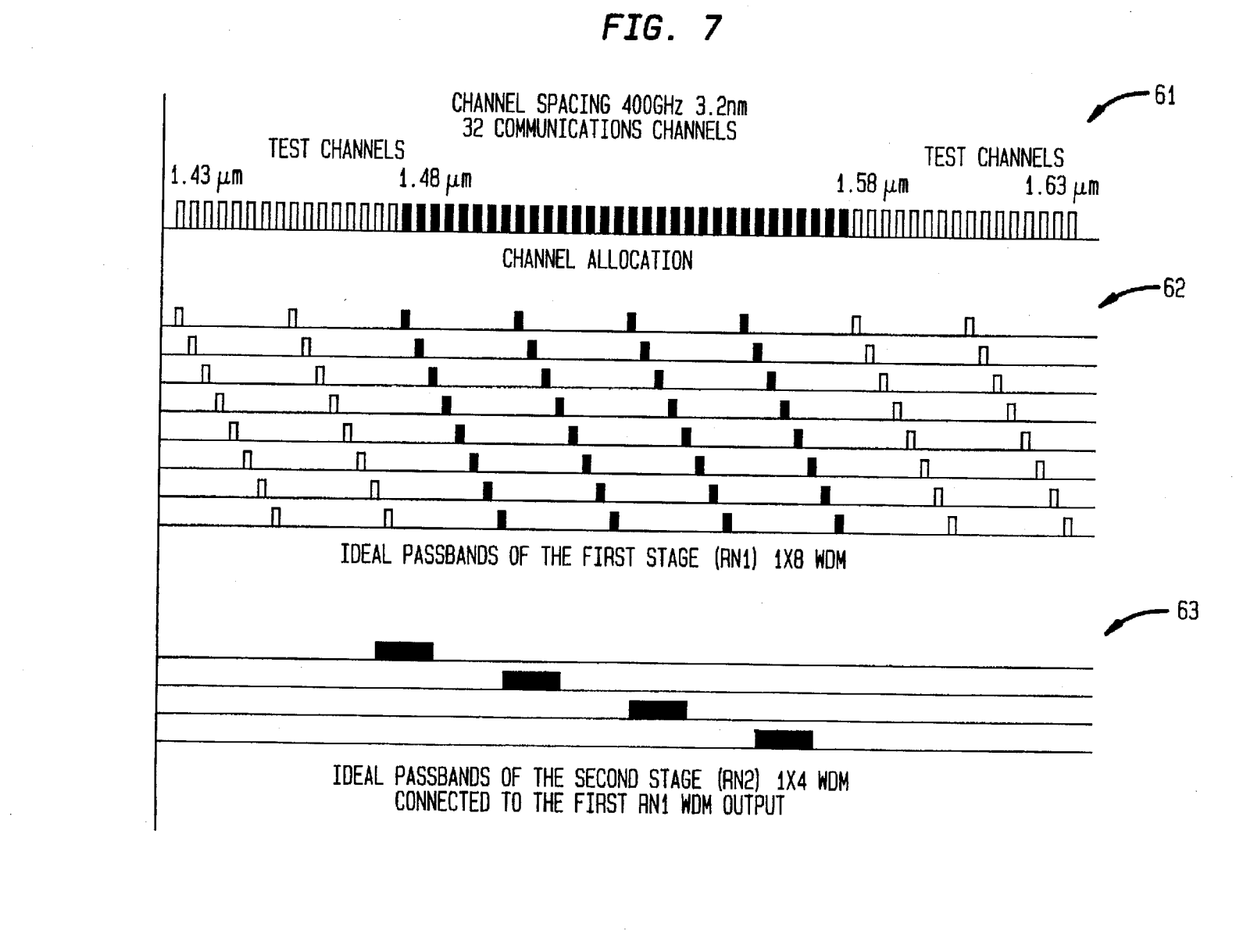
FIG. 7 is a graph illustrating channel passbands in the specific comb splitting system of FIG. 4.

An example of an allocation plan for the thirty-two WDM channels operated upon by the comb splitting system 40 is shown at reference numeral 61 in FIG. 7. Also shown in FIG. 7 at respective reference numerals 62, 63 are the ideal DWDM passbands of the first stage WDM/PS mechanisms 16 and of one of the second stage WDM/PS mechanisms 22. The WDM band is preferably around 1.5 µm and the PS band is preferably around 1.3 µm, but they can also be interchanged, or at other wavelengths. The channel spacing is about 400 GHz (wavelength of about 3.2 nm). The first stage WDM/PS mechanism 16 (FIG. 4) has a passband spacing of about 400 GHz and FSR of about 8×400 GHz, and needs no birefringence correction and only a small degree of passband flattening. The second stage DWDMs 56 (FIG. 6) have a passband spacing of about 8×400 GHz and FSR 32×400 GHz, and do not need passband flattening and feedback control. Because of the large passband spacing and small number of splits for the second stage DWDM 56, a Fourier transform based waveguide filter (FF) is preferably used, instead of a WGR.

The 32 channels occupy a total bandwidth of approximately one hundred nm from 1.48 µm to 1.58 µm. The wavelengths outside this wavelength range, namely from 1.43 µm to 1.88 µm and from 1.58 µm to 1.63 µm, can optionally be used to deliver one more channel to each LU or used for testing purposes. If two channels are delivered to each LU, a simple CWDM, e.g., a well known Mach-Zehnder interferometer, can be used in each ONU to separate the two channels. If the extra channels are used for testing, the FSR of the second stage DWDMs 56 (FIG. 6) can be increased to about 64×400 GHz, thereby blocking the testing signal from reaching the ONU.

Figure 8:
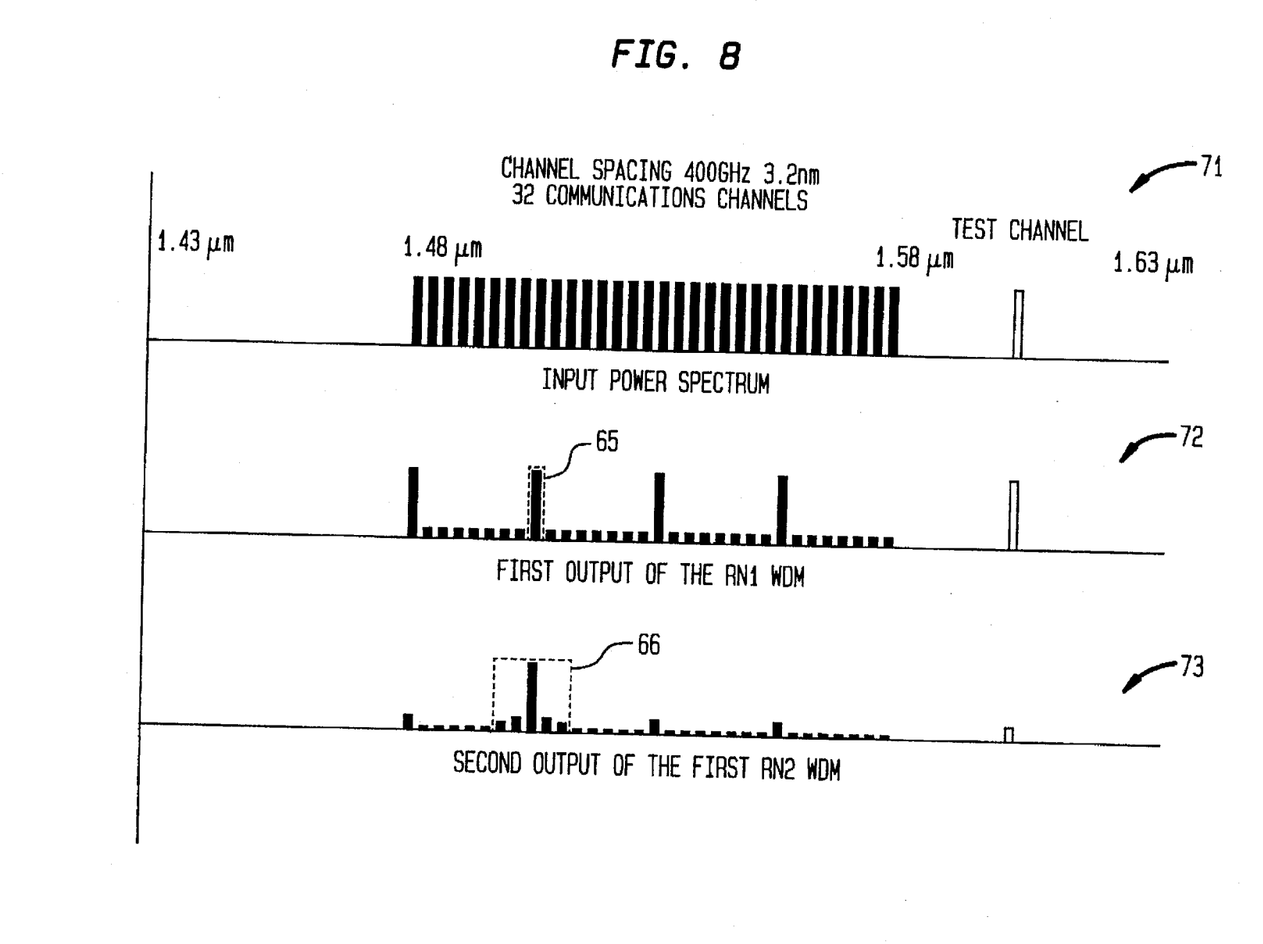
FIG. 8 is a graph illustrating channel separation, filtering, and crosstalk along the wavelength spectrum in the specific comb splitting system of FIG. 4.

The comb splitting system 40 (FIG. 4) significantly diminishes crosstalk between channels. In this regard, FIG. 8 shows at reference numeral 71 the power spectrum at the input of the first stage WDM/PS mechanism 16 when all of the thirty-two channels and one test channel are active but uncorrelated, with the same power levels. FIG. 8 further shows the spectrum of the first and second stage outputs 18, 24 (FIG. 4) at reference numerals 72, 73, respectively. Moreover, in FIG. 8, the broken line region 65 represents the ideal passband of the first stage WDM/PS mechanism 16 (FIG. 4), and the broken line region 66 represents the ideal passband of the second stage WDM/PS mechanism 22 (FIG. 4).

When two stages of WDMs, with crosstalk levels of $\delta_1$ and $\delta_2$, respectively, are cascaded in the comb splitting system 40, the crosstalk signal from the first stage (of relative magnitude $\delta_1$) is reduced by a factor $\delta_2$ in the second stage, except for channels adjacent to the pass channels. The channels at the edges of the passband of the second stage WDM have a crosstalk reduction of ¯0.5. Thus, in the final output that passes channel 9, the crosstalk signals are channels 8 and 10 of relative magnitude $\delta_1$, channels 7 and 11 of relative magnitude $\delta_1/2$, channels 1, 17, 25, and the test channel of relative magnitude $\delta_2$, and channels 2–6, 12–16, 18–24, and 26–32 of relative magnitude $\delta_1\delta_2$. The accumulated crosstalk is therefore $3\delta_1+4\delta_2 30\ 24\delta_1\delta_2$. Realistic crosstalk levels achievable with our current waveguide technology are $\delta_1\tilde{\ }0.005$ and $\delta_2\tilde{\ }0.0025$ (i.e. −23 and −26 db), and the accumulated crosstalk is $\tilde{\ }0.025$ or −16 dB. Note that if a single stage 1×32 WDM were used, the accumulated crosstalk level would be $31\delta_1\tilde{\ }0.15$ (−7.5 dB), and therefore the multistage comb splitting scheme offers an effective crosstalk reduction, which is an important factor that makes it practical. If sixty-four channels are active, an accumulated crosstalk would degrade by three dB, but it is still below the required crosstalk level for digital video transmission.

It will be obvious to those skilled in the art that many modifications and variations may be made to the embodiments as described without substantially departing from the spirit and scope of the present invention. It is intended that all such modifications and variations be included herein within the scope of the present invention, as is set forth in the appended claims.

Wherefore, the following is claimed:

1. A comb splitting system for demultiplexing an optical signal into a plurality of individual channels at various wavelengths, comprising:
    first stage wavelength division multiplexer (WDM) for receiving said optical signal having said plurality of individual channels at various wavelengths and for simultaneously demultiplexing said plurality into bands by utilizing first bandpasses, each of said bands having a plurality of said individual channels that are separated by at least one other of said channels; and
    a plurality of second stage WDMs for simultaneously demultiplexing said individual channels from each of said bands with second bandpasses that are wider than said first bandpasses.

2. The system of claim 1, wherein there are NM of said individual channels and M second stage WDMs, each Ith WDM of said M second stage WDMs receiving and demultiplexing a channel I and a channel (M+I) of said NM channels.

3. The system of claim 1, wherein said first and second stage WDMs reside on a single integrated circuit.

4. The system of claim 1, wherein said first and second stage WDMs reside within separate discrete electronic components that are connected locally at a node of an optical fiber network.

5. The system of claim 1, wherein said first and second stage WDMs are separated and reside at different nodes of an optical fiber network and are interconnected via a fiber cable so that a distribution network is formed.

6. The system of claim 1, wherein at least one of said first and second stage WDMs each further comprise a Dragone router.

7. The system of claim 1, further comprising optical fibers configured to transfer said bands from said first stage WDM to said second stage WDMs.

8. The system of claim 1, further comprising waveguides configured to transfer said bands from said first stage WDM to said second stage WDMs.

9. The system of claim 1, wherein said channels are approximately equally spaced along a frequency spectrum.

10. The system of claim 1, further comprising a power splitter associated with each said WDM, said power splitters configured to collectively demultiplex a plurality of power channels that are multiplexed on said optical signal.

11. The system of claim 2, wherein at least one of said first and second stage WDMs comprises a Fourier filter.

12. A comb splitting system for multiplexing a plurality of individual channels at various wavelengths into an optical signal, comprising:
    a plurality of first stage wavelength division multiplexers (WDMs) for producing bands by simultaneously multiplexing said individual channels with first bandpasses, each of said bands having a plurality of said individual channels that are separated by at least one other of said channels; and
    a second stage wavelength division multiplexer (WDM) for providing said optical signal having said plurality of individual channels at various wavelengths by simultaneously multiplexing said bands by utilizing second bandpasses, said second bandpasses being narrower than said first bandpasses.

13. The system of claim 12, wherein there are NM of said individual channels and M second stage WDMs, each Ith WDM of said M second stage WDMs multiplexing a channel I and a channel (M+I) of said NM channels.

14. The system of claim 12, wherein said first and second stage WDMs are passive elements.

15. The system of claim 12, wherein at least one of said first and second stage WDMs each further comprise a Dragone router.

16. The system of claim 12, further comprising optical fibers configured to transfer said bands from said first stage WDM to said second stage WDMs.

17. The system of claim 12, further comprising waveguides configured to transfer said bands from said second stage WDMs to said first stage WDM.

18. The system of claim 12, wherein said channels are approximately equally spaced along a frequency spectrum.

19. The system of claim 12, further comprising a power splitter associated with each said WDM, said power splitters configured to collectively multiplex a plurality of power channels that are multiplexed on said optical signal.

20. The system of claim 12, wherein at least one of said first and second stage WDMs comprises a Fourier filter.

21. The system of claim 13, wherein N is 2 and M is 2.

22. The system of claim 13, wherein N is 4 and M is 8.

23. A comb splitting system for demultiplexing an optical signal having a plurality of individual channels at respective wavelengths into the individual channels, comprising:
    (a) a first stage for receiving said optical signal that has NM channels, said first stage having a wavelength division multiplexer (WDM) configured to simultaneously demultiplex said NM channels into M bands;
    (b) a second stage having M WDMs configured to receive a respective band and to simultaneously demultiplex individual channels from said respective bands, each of said bands having channels I and (M+I) at each Ith WDM; and
    (c) wherein said M WDMs of said second stage have wider bandpasses for demultiplexing said channels than those bandpasses of said WDM of said first stage.

24. The system of claim 23, wherein said first and second stages are passive networks.

25. The system of claim 23, wherein said WDMs of said first and second stages each comprise a Dragone router.

26. The system of claim 23, further comprising optical fibers configured to transfer said bands from said first stage to said second stage.

27. The system of claim 23, further comprising waveguides configured to transfer said bands from said first stage to said second stage.

28. The system of claim 23, wherein said channels are approximately equally spaced along a frequency spectrum.

29. The system of claim 23, wherein said WDMs each comprise a Fourier filter and wherein M and N both equal 2.

30. The system of claim 23, further comprising a power splitter associated with each said WDM, said power splitters configured to collectively demultiplex a plurality of power channels that are multiplexed on said optical signal.

31. The system of claim 23, wherein N is 2 and M is 2.

32. The system of claim 23, wherein N is 4 and M is 8.

33. A comb splitting method for demultiplexing an optical signal into a plurality of individual channels at respective wavelengths, comprising the steps of:

receiving said optical signal having said plurality of individual channels at various wavelengths;

simultaneously demultiplexing bands of individual channels from said plurality by utilizing first bandpasses in a first WDM, said channels in each of said bands being separated by at least one other channel; and simultaneously demultiplexing individual channels from each of said bands with second bandpasses in second WDMs that are wider than said first bandpasses.

34. A comb splitting method for multiplexing a plurality of individual channels at respective wavelengths to form an optical signal, comprising the steps of:

receiving said plurality of individual channels at various wavelengths;

simultaneously multiplexing said individual channels from said plurality into bands by utilizing first bandpasses in a first WDM, said channels in each of said bands being separated by at least one other channel; and producing said optical signal by simultaneously multiplexing said bands with second bandpasses in second WDMs that are narrower than said first bandpasses.

* * * * *